United States Patent
Liao et al.

(10) Patent No.: US 7,072,273 B2
(45) Date of Patent: Jul. 4, 2006

(54) METHOD FOR CONTROLLING OUTPUT POWER OF A PICK-UP HEAD USING AUTOMATIC POWER CONTROL LOOP

(75) Inventors: Hsueh-Kun Liao, Yun-Lin Hsien (TW); Hseang-Ji Hsieh, Taipei Hsien (TW)

(73) Assignee: MediaTek Inc., Hsin-Chu (TW)

( * ) Notice: Subject to any disclaimer, the term of this patent is extended or adjusted under 35 U.S.C. 154(b) by 112 days.

(21) Appl. No.: 10/249,221

(22) Filed: Mar. 24, 2003

(65) Prior Publication Data
US 2004/0052184 A1 Mar. 18, 2004

(30) Foreign Application Priority Data
Sep. 13, 2002 (TW) .............................. 91121067 A

(51) Int. Cl.
*G11B 7/125* (2006.01)
(52) U.S. Cl. ..................................... 369/116; 369/47.5
(58) Field of Classification Search ................ 369/116, 369/47.53, 53.26, 53.27; 372/31, 38.02; 385/31
See application file for complete search history.

(56) References Cited

U.S. PATENT DOCUMENTS

| | | | |
|---|---|---|---|
| 4,845,720 A * | 7/1989 | Koishi et al. | 372/31 |
| 4,935,915 A * | 6/1990 | Fujiwara et al. | 369/116 |
| 6,304,586 B1 * | 10/2001 | Pease et al. | 372/38.02 |
| 6,728,178 B1 * | 4/2004 | Koishi et al. | 369/47.53 |
| 2004/0057663 A1 * | 3/2004 | Sato et al. | 385/31 |

* cited by examiner

*Primary Examiner*—William Korzuch
*Assistant Examiner*—Michael V. Battaglia
(74) *Attorney, Agent, or Firm*—Winston Hsu

(57) ABSTRACT

A method for automatically controlling output power of a pick-up head. When output power of a pick-up head is to be changed, a first switch is utilized to connect a first input port of a comparator circuit to a supply source, and a second switch is utilized to connect a first signal source to a driver circuit such that the driver circuit will control the output power according to a first signal. When voltage drop between the first input port and a output port of the comparator circuit stabilizes, the first switch is utilized to connect the first input port to a sensor, and the second switch is utilized to connect the output port and the driver circuit such that the driver circuit will control the output power according to a comparative signal.

24 Claims, 4 Drawing Sheets

METHOD FOR CONTROLLING OUTPUT POWER OF A PICK-UP HEAD USING AUTOMATIC POWER CONTROL LOOP

BACKGROUND OF INVENTION

1. Field of the Invention

The present invention relates to a method for automatically controlling output power, and more particularly, to a method for automatically controlling output power of a pick-up head of an optical drive with an APC loop.

2. Description of the Prior Art

In recent years, along with the increasing operating capability of the computer system combined with the development of Internet technology, users have widely made use of the computer system as the multi-media audiovisual medium and made use of the computer as a bridge for connecting with a network to access all kinds of information. Due to the increasing need of the data storage quantity, various tools and apparatuses for storing data immediately become popular. Since the optical disk has the advantages of compactness, large storage capacity, and inexpensiveness, related products became very attractive. Recently, the functions of the optical drive (such as a CD-RW drive) have increased, and the reading quality and access speed of the optical drive have been improved continuously. Moreover, in addition to the original specification of CD, the new specification of DVD appears with much larger capacity and the same physical volume with CD. Nowadays, the optical drive has become the standard equipments of the computer system.

The CD-RW drive access data according to the optical principles, therefore the reading and writing operations depend on a pick-up head, which is usually a laser head. During the reading process, the CD-RW drive will set the output power of the output laser of the pick-up head to a predetermined value to set the wavelength of the output laser to a constant value so that the wavelength of reflected light is equal to a value of a optical signal that a sensor of the CD-RW drive can detect. The optical disk stores the data by the way of pressing or recording some concaves, convexes, or special membranes with various optical characteristics on the surface of the optical disk so that the optical sensor can distinguish a plurality of different wavelengths of reflected light to store the data with the digital form. During the writing process, a CD-RW drive also will set the output power of the output laser of the pick-up head to a predetermined value to set the wavelength of the output laser to a constant value so that the pick-up head can identify the parameters of the membranes on the surface of the optical disk and control the laser to output a plurality of wavelengths continuously according to the digital data to be written onto the optical disk. Therefore, the digital data can be pressed and recorded onto the optical disk.

Please refer to FIG. 1. During the reading process and writing process, in order to make the CD-RW drive maintain the output power of the laser pick-up head at a predetermined value without fluctuating with the changes of the environment such as the temperature, the prior art usually makes use of an APC loop 10 in a CD-RW drive as shown in FIG. 1 to form a feedback closed loop with a pick-up head 20 for stabilizing the output power. The APC loop 10 comprises a drive circuit 18, a comparator circuit 14, a sensor 12, and a signal source 16. The drive circuit 18 is electrically connected to the pick-up head 20 for driving the pick-up head 20. The comparator circuit 14 comprises a first input port, a second input port, and an output port. The comparator circuit 14 compares two signals respectively transmitted from the first input port and the second input port to generate a corresponding comparative signal y. The output port is electrically connected to the drive circuit 18 for outputting the comparative signal y to the drive circuit 18. The sensor 12 is used to detect the output power of the pick-up head 20 to generate a corresponding detecting signal ϵ and to input the detecting signal ϵ to the first inputs port of the comparator circuit 14. The signal source 16 is used to provide a signal γ to the second input port of the comparator circuit 14, and the signal γ represents the expected value of the output power of the pick-up head 20 of the CD-RW drive. The sensor 12 creates the signal E which then feedbacks to the comparator circuit 14, and the APC loop 10 makes use of the comparator circuit 14 to compare the feed-backed signal E with the signal γ representing the expected value of output power to generate the comparative signal y for controlling the output power of the pick-up head 20. Making use of the feedback control mechanism and designing the APC loop 10 with proper parameters can maintain the output power of the pick-up head 20 at an anticipant value. The user can insert various signal amplification circuits or power amplification circuits among the components of the APC loop 10 (such as inserting amplification circuits between the output port of the comparator circuit 14 and the drive circuit 18) according to practical needs. Moreover, the comparator circuit 14 can be achieved with various circuit configurations, and generally the comparator circuit 14 comprises an operational amplifier 22, a capacitor 24, and two resistors 26 and 28 that are connected as shown in FIG. 1. The signal source 16 usually is a digital signal-processing (DSP) chip for generating a digital signal that is transformed through a D/A converter.

However, the APC loop 10 has a very serious drawback when the output power of the pick-up head 20 is to be changed in the CD-RW drive. That is, the APC loop 10 needs to take a period of time to reach steady state. Please refer to FIG. 2. FIG. 2 is a schematic diagram showing how the signal γ, the comparative signal y, the detecting signal ϵ (as shown in FIG. 1), and the voltage drop Vc of the capacitor 24 vary with the time dimension t. Please notice that regarding the parameters of the components of the APC loop 10, when the signal γ is set as γ1 and the APC loop 10 reaches the steady state, the comparative signal y can be set as γ1, the detecting signal ϵ can be set as γ1, and the voltage drop Vc is (γ1−y1). When the signal γ is γ2 and the APC loop 10 reaches the steady state, the comparative signal y is y2, the detecting signal ϵ is γ2, and the voltage drop Vc becomes (γ2−y2). When that CD-RW drive wants to raise the output power of the pick-up head 20 from a lower value to a higher value, the signal y will be switched from γ1 to γ2 at time t1. At this time, the voltages of all nodes in the APC loop 10 will be shifted from original steady-state values to new steady-state values. However, due to the effect of capacitance in the APC loop 10 (such as the capacitor 24 that provides most of the effect of capacitance in the APC loop 10 as shown in FIG. 1), the new steady state will be reached after the effective capacitor is charged. As shown in FIG. 2, the voltage drop Vc is (γ1−y1) at time t1, and then at time t2 the voltage drop Vc enters a steady-state value (γ2−y2) after charging process. Similarly, the comparative signal y is y1+(γ2−γ1) at time t1, and at time t2 the comparative signal y reaches a steady-state value y2 after charging process. The detecting signal ϵ is γ2 at time t1, and then enters a steady-state value γ2 at time t2. When that CD-RW drive wants to adjust the output power of the pick-up head 20 from a higher value to a lower value, the signal γ will be shifted from γ2 to γ1 at time t3. At this time, the voltages of all nodes in the APC loop 10 willbe shifted from original steady-state values to new steady-state values. However, due to the effect of capacitance in the APC loop 10, the new steady state will be reached after the effective capacitor is discharged. As shown in FIG. 2, the voltage drop Vc is (γ2−y2) at time t3, and then enters a steady-state value (γ1−y1) at time t4 after discharging process. Similarly, the comparative signal y is y2−(γ2−γ1) at time t3, and then enter a steady-state value y1 at time t4 after discharging process. The detecting signal ε is γ1 at time t3, and then reaches a steady-state value γ1 at time t4 after discharging process.

The above-mentioned effect of capacitance in the APC loop resulting from the charging/discharging process toward the effective capacitor will cause a period of time of unsteady state, and the unsteady state will do harm to the operations of the CD-RW drive. During the writing process, when the reading speed of a buffer is higher than the writing speed, the CD-RW drive must stop recording until the register enters the idle status. Because the long period of time of unsteady state leads to the destabilization of the output power, bug data are easily generated in the connecting point. During the reading process, the long period of time of unsteady state easily leads to the servo failure. For example, the tracking servo or the focusing servo may be out of control during the reading process.

SUMMARY OF INVENTION

It is therefore a primary objective of the claimed invention to provide a method of utilizing two switches in an APC loop for quickly letting the APC loop reach a steady state and by utilizing an open loop for providing a predetermined voltage to perfectly switch the output power of the pick-up head to solve the above-mentioned problems of the prior art.

According to the claimed invention, a method for automatically controlling output power of a pick-up head of a CD-RW drive with an automatic power control loop (APC Loop) is disclosed. The automatic power control loop comprises: a sensor for detecting the output power of the pick-up head and for generating a corresponding detecting signal; a comparator circuit comprising a first input port, a second input port, and an output port, wherein the output port is for outputting a comparative signal; a first switch for selecting either an output signal of a power supply or the detecting signal of the sensor, and for transmitting the selected signal to the first input port of the comparator circuit; a first signal source for providing a first signal; a drive circuit electrically connected to the pick-up head for driving the pick-up head; and a second switch for selecting either the first signal or the comparative signal, and for transmitting the selected signal to the drive circuit. The method comprises: utilizing the first switch to connect the first input port of the comparator circuit to the power supply when the output power of the pick-up head is to be changed, and utilizing the second switch to connect the first signal source to the drive circuit so that the drive circuit can control the output power of the pick-up head according to the first signal; and utilizing the first switch to connect the first input port of the comparator circuit to the sensor while the voltage difference between the first input port and the output port of the comparator circuit stabilizes, and utilizing the second switch to connect the output port of the comparator circuit to the drive circuit so that the drive circuit can control the output power of the pick-up head according to the comparative signal.

The claimed invention makes use of two switches to switch an APC loop from a closed loop to an open loop when the output power of the pick-up head is to be changed. On one hand the claimed invention makes use of a power supply to accelerate the charging/discharging time of the effective capacitor, on the other hand the claimed invention provides a predetermined signal value to control the output power of the pick-up head until the APC loop reaches a new steady state. Afterwards, the claimed invention makes use of these two switches to switch the APC loop back to the closed loop to significantly decrease the time by which the APC loop reaches the steady state.

DETAILED DESCRIPTION

Figure 1:
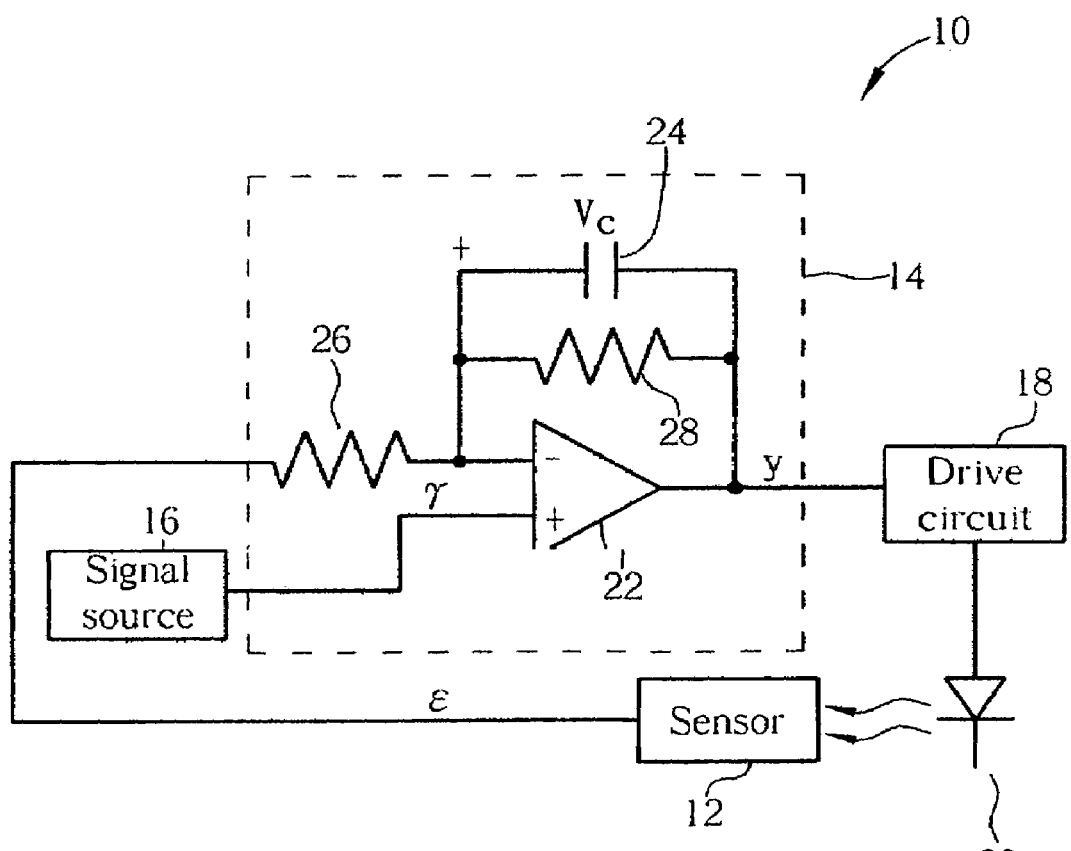
FIG. 1 is a functional block diagram of an APC loop of the prior art.
Figure 3:
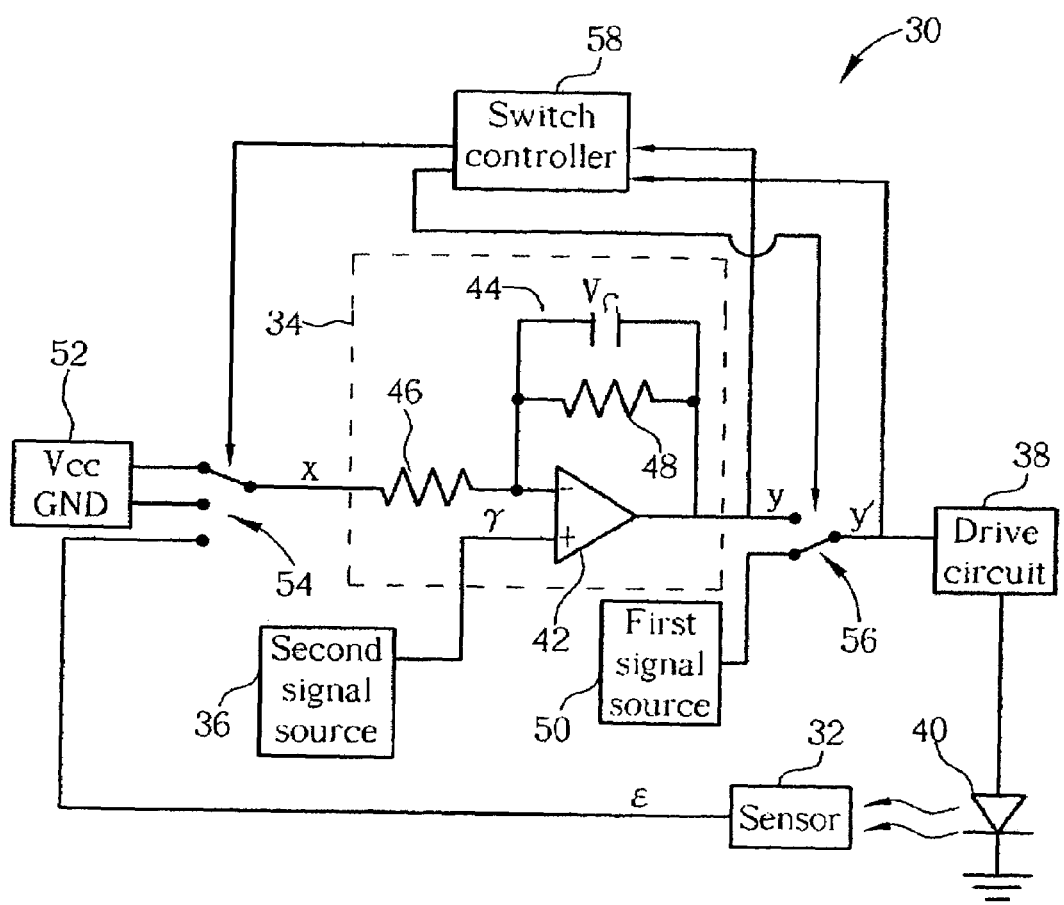
FIG. 3 is a functional block diagram of an APC loop of the present invention.

Please refer to FIG. 3. FIG. 3 is a functional block diagram of an APC loop 30 of the present invention. The APC loop 30 comprises a sensor 32, a drive circuit 38, a comparator circuit 34, a first switch 54, a second switch 56, a first signal source 50, a switch controller 58, and a second signal source 36. The sensor 32 is used to detect output power of a pick-up head 40 to generate a corresponding detecting signal ε. The comparator circuit 34 comprises a first input port, a second input port, and an output port. The comparator circuit 34 is used to compare two signals inputted from the first input and the second input port to generate a corresponding comparative signal y, and the output port is used to output the comparative signal y. The first switch 54 is used to select either an output signal of a power supply 52 or the detecting signal E of the sensor 32 to input the selected signal to the first input port of the comparator circuit 34. The first signal source 50 is used to provide a first signal. The drive circuit 38 is electrically connected to the pick-up head 40 for driving the pick-up head 40. The second switch 56 is used to select either the first signal or the comparative signal y to output the selected signal to the drive circuit 38. The second signal source 36 is used to provide a second signal y to the second input port of the comparator circuit 34, and the second signal y represents the expected value of the output power of the pick-up head 40 in the CD-RW drive. The switch controller 58 is used to control the first switch 54 and the second switch 56 according to at least one node signal value in the APC loop 30. The user can insert various signal amplification circuits or power amplification circuits among the components of the APC loop 30 (such as inserting amplification circuits between the output port of the comparator circuit 34 and the drive circuit 38) according to practical needs. The sensor 32 is usually a photodiode for detecting the output power of the pick-up head 40. The comparator circuit 34 can be achieved with various circuit configurations, and generally the comparator circuit 34 comprises an operational amplifier 42, a capacitor 44, and two resistors 46 and 48 that are connected as shown in FIG. 1. The second signal source 36 usually is a digital signal-processing (DSP) chip for generating a digital signal that is transformed through a D/A converter. In addition, the power supply 52 can be a voltage source to provide a plurality of output voltage signals as shown in the following embodiment, and the power supply 52 also can be a current source to provide a plurality of output current signals. In an embodiment of the present invention, the first signal source 50 is generated by a set of comparative signals y according to the initial calibration process from a closed loop status to the steady state of the APC loop 30 in the CD-RW drive. The power supply comprises a system voltage Vcc and a voltage source 52 of a ground potential GND. The switch controller 58 controls the first switch 54 and the second switch 56 according to the comparative signal y of the comparator circuit 34 and the first signal. The operating principles are described as follows. When the second signal γ generates a step transition, the switch controller 58 will utilize the first switch 54 from the detecting signal ε to the voltage source 52, and utilize the second switch 56 from the signal y to the first signal. When number of times equals to two at which the comparative signal y is equivalent to the signal, the switch controller 58 will return the first switch 54 from the voltage source 52 to the detecting signal ε. At the same, the switch controller 58 will return the second switch 56 from the firstsignal to the signal y. The APC loop 30 of the present invention is described in detail in FIG. 4.

Figure 2:
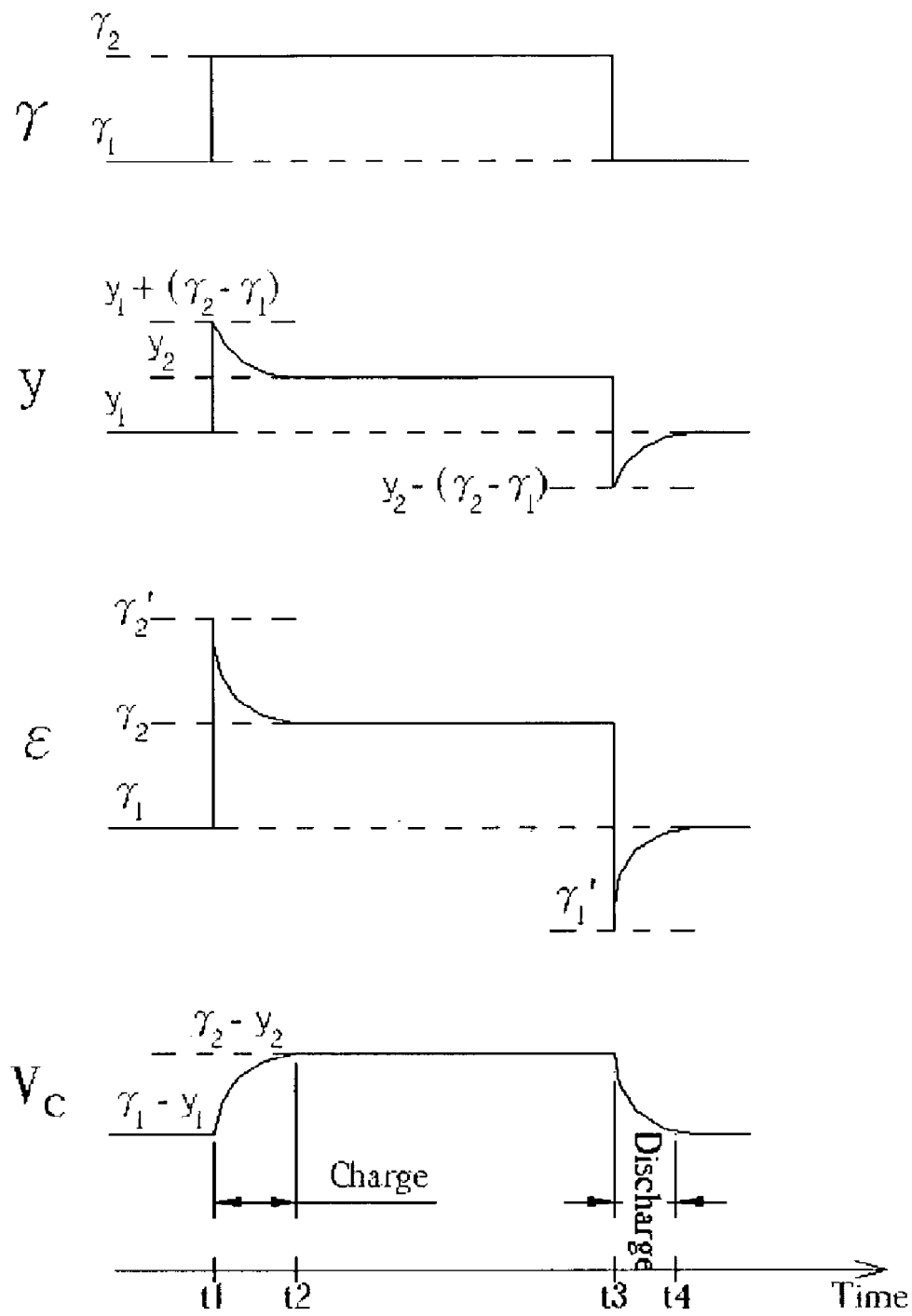
FIG. 2 is a schematic diagram showing all signals in the APC loop as shown in FIG. 1 varying with time.
Figure 4:
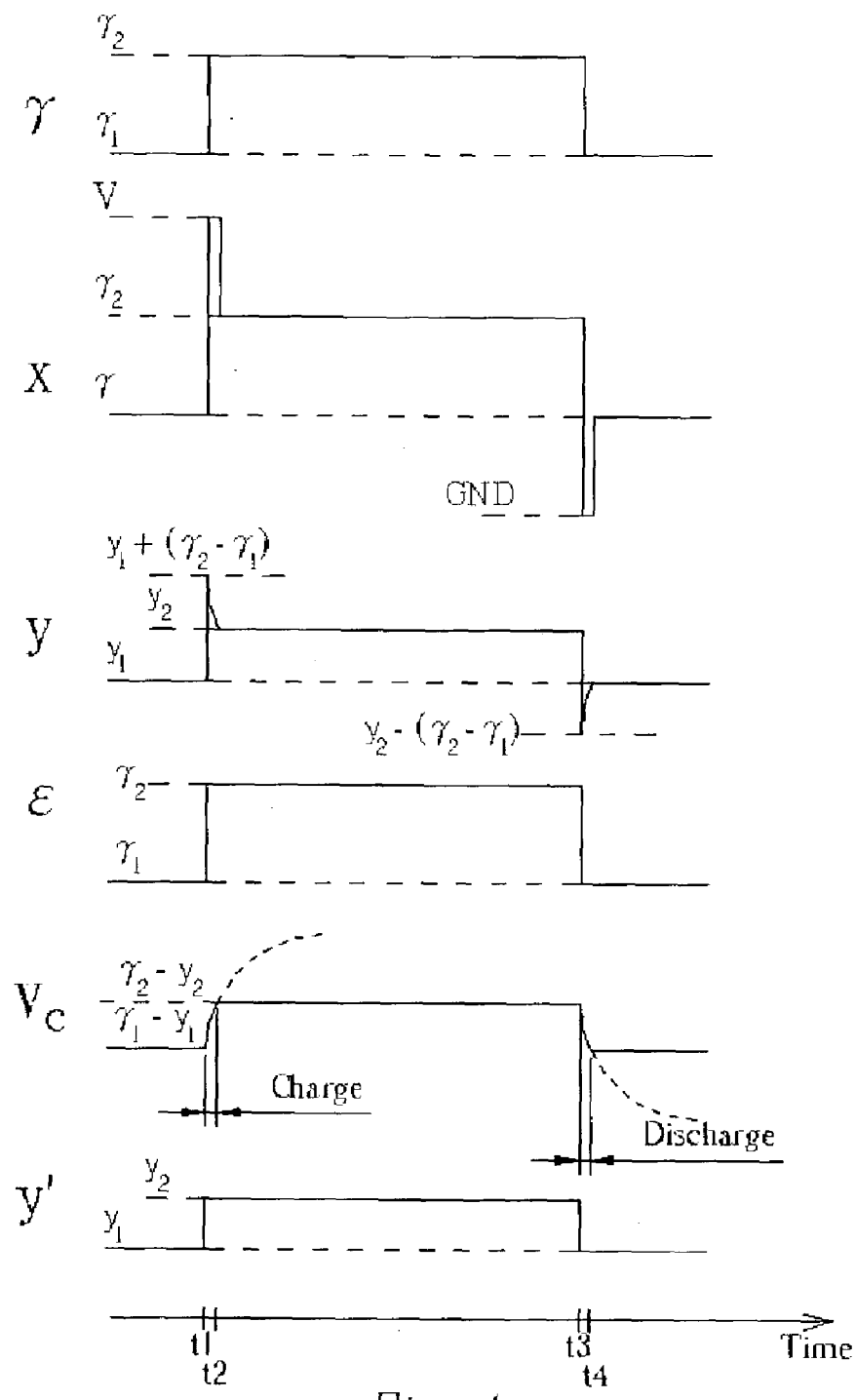
FIG. 4 is a schematic diagram showing all signals in the APC loop as shown in FIG. 3 varying with time.

FIG. 4 is a schematic diagram showing how the second signal γ, the output signal x of the first switch, the comparative signal y, the detecting signal ε, voltage drop Vc of the capacitor 44, and the output signal y" of the second switch vary along with the time t. Please notice that regarding the parameters of the components of the APC loop 30, when the signal γ is set as γ1 and the APC loop 30 reaches the steady state, the comparative signal y can be set as y1, the detecting signal ε can be set as γ1, and the voltage drop Vc is (γ1−y1). When the signal γ is γ2 and the APC loop 30 reaches the steady state, the comparative signal y is y2, the detecting signal ε is γ2, and the voltage drop Vc becomes (γ2−y2). When that CD-RW drive wants to raise the output power of the pick-up head 40 from a lower value to a higher value, the signal γ will be switched from γ1 to γ2 at time t1. At this time, if y>y', the switch controller 58 will utilize the first switch 54 from the detecting signal ε to the system voltage Vcc of the voltage source 52 (as shown in FIG. 4, the output signal χ jumps to Vcc at time t1). Afterwards, the system voltage Vcc will quickly charge the capacitor 44 to make the voltage drop Vc from the value of (γ1−y1) at time t1 enter the steady-state value (γ2−y2) at time t2 in a very short time, and the switch controller 58 also will utilize the second switch 56 from the comparative signal y to the first signal. Since the first signal is generated through the initial calibration, the first signal is almost equal to the steady-state value y2 of the signal y. Hence the first signal can replace the comparative signal y to be inputted into the drive circuit 38 before the comparative signal y reaches the steady-state value y2 for generating an output power of the pick-up head 40 that approximates to the expected output power. After the comparative signal y reaches the steady-state value y2, the switch controller 58 utilizes those two switches and returns the APC loop 30 to a closed loop for providing stabilization of the output power. When the CD-RW drive wants to raise the output power of the pick-up head 20 from a higher value to a lower value, the signal γ will be switched from γ2 to γ1 at time t3. If y<y', the switch controller 58 will utilize the first switch 54 from the detecting signal ε to the GROUND POTENTIAL GND of the voltage source 52 (as shown in FIG. 4, the output signal χ decreases to ground potential GND at time t3). Afterwards, the ground potential GND will quickly discharge the capacitor 44 to make the voltage drop Vc from the value of (γ2−y2) at time t3 enter the steady-state value (γ1−y1) at time t2 in a very short time, and the switch controller 58 also will utilize the second switch 56 from the comparative signal y to the first signal. Since the first signal is generated through the initial calibration, the first signal is almost equal to the steady-state value y1 of the signal y. Hence the first signal can replace the comparative signal y to be inputted into the drive circuit 38 before the comparative signal y reaches the steady-state value y2 for generating an output power of the pick-up head 40 that approximates to the expected output power. After the comparative signal y reaches the steady-state value y1, the switch controller 58 utilizes those two switches and returns the APC loop 30 to a closed loop for providing stabilization of the output power. Comparing the present invention as shown in FIG. 2 to the prior art as shown in FIG. 2, the capacitor 44 of the present invention has much shorter charging time (t2−t1) and the discharging time (t4−t3) than the charging time (t2−t1) and the discharging time (t49−t3) of the capacitor 24 in the prior art. That is, compared with the prior art, the comparative signal y of the present invention arrives at the steady state sooner since the present invention makes use of a relative-large voltage drop to charge/discharge the capacitor 44. In addition, the output signal y of the second switch for controlling the output power of the pick-up head 40 is almost maintained to a steady-state value since the present invention makes use of the first signal that approximates to the steady-state value of the comparative signal y to replace the comparative signal y to be inputted into the drive circuit 38 before the comparative signal y reaches the steady-state value y2 for generating an output power of the pick-up head 40 that approximates to the expected output power. Therefore, the APC loop 30 of the present invention can quickly stabilize the output power of the pick-up head 40.

In contrast to the prior art, the method of the present invention makes use of a first switch to charge/discharge the effective capacitor of the APC loop and a second switch to provide a signal that approximates the steady-state value of the comparative signal to replace the comparative signal to be inputted into the drive circuit 38 for controlling the output power of the pick-up head. Therefore, the APC loop of the present invention can quickly stabilize the output power of the pick-up head. Moreover, in addition to the CD-RW drive, the APC loop of the present invention can also be applied to various rewritable optical drives, including DVD-RW, DVD+RW, DVD-RAM, and so on.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A method for automatically controlling output power of a pick-up head of an optical drive with an automatic power control loop (APC Loop), the automatic power control loop comprising:
   a sensor for detecting the output power of the pick-up head and for generating a corresponding detecting signal;
   a comparator circuit comprising a first input port, a second input port, and an output port, wherein the output port is for outputting a comparative signal;
   a first switch for selecting either an output signal of a power supply or the detecting signal of the sensor, and for transmitting the selected signal to the first input port of the comparator circuit;
   a first signal source for providing a first signal;
   a drive circuit electrically connected to the pick-up head for driving the pick-up head; and a second switch for selecting either the first signal or the comparative signal, and for transmitting the selected signal to the drive circuit;

the method comprising:

utilizing the first switch to connect the first input port of the comparator circuit to the power supply when the output power of the pick-up head is to be changed, and utilizing the second switch to connect the first signal source to the drive circuit so that the drive circuit controls the output power of the pick-up head according to the first signal; and utilizing the first switch to connect the first input port of the comparator circuit to the sensor while the voltage difference between the first input port and the output port of the comparator circuit stabilizes, and utilizing the second switch to connect the output port of the comparator circuit to the drive circuit so that the drive circuit controls the output power of the pick-up head according to the comparative signal.

2. The method of claim 1, wherein the power supply is a voltage source, and the output signal of the power supply is a voltage signal.

3. The method of claim 2, wherein the voltage source provides a ground potential.

4. The method of claim 1, wherein the power supply is a current source, and the output signal of that power supply is a current signal.

5. The method of claim 1, wherein the first signal is generated from calibrating the comparative signal of the comparator circuit when the voltage difference between the first input port and the output port of the comparator circuit approaches stabilization.

6. The method of claim 1, wherein the second input port of the comparator circuit is connected to a second signal source for inputting a second signal, and the comparator circuit will compare the second signal with the output signal of the power supply or with the detecting signal of the sensor so as to generate the comparative signal.

7. The method of claim 6, wherein the second signal source is a digital to analog (D/A) converter.

8. The method of claim 1, wherein the APC loop further comprises a switch controller for controlling the first switch and the second switch according to the comparative signal of the comparator circuit and the first signal.

9. The method of claim 8, wherein when the output power of the pick-up head is to be changed, the switch controller will utilize the first switch to connect the first input port of the comparator circuit to the power supply, the switch controller will utilize the second switch to connect the first signal source to the drive circuit, and afterwards when the number of times that the comparative signal is equivalent to the first signal reaches a predetermined value, the first switch is utilized to connect the first input port of the comparator circuit to the sensor, and the second switch is utilized to connect the output port of the comparator circuit to the drive circuit.

10. The method of claim 1, wherein the comparator circuit comprises an operation amplifier, a capacitor, and two resistors.

11. The method of claim 1, wherein the sensor is a photodiode for detecting the output power of the pick-up head.

12. The method of claim 1, wherein the APC loop further comprises an amplification circuit electrically connected to the second switch for amplifying the first signal or the comparative signal.

13. An automatic power control loop (APC Loop) for automatically controlling output power of a pick-up head of an optical drive, the APC loop comprising:

a sensor for detecting the output power of the pick-up head and generating a corresponding detecting signal;

a comparator circuit comprising a first input port, a second input port, and an output port, wherein the output port is for outputting a comparative signal;

a first switch for selecting either an output signal of a power supply or the detecting signal of the sensor, and for transmitting the selected signal to the first input port of the comparator circuit;

a first signal source for providing a first signal;

a drive circuit electrically connected to the pick-up head for driving the pick-up head; and a second switch for selecting either the first signal or the comparative signal, and for transmitting the selected signal to the drive circuit;

wherein when the output power of the pick-up head is to be changed, the first switch is utilized to connect the first input port of the comparator circuit to the power supply, and the second switch is utilized to connect the first signal source to the drive circuit so that the drive circuit controls the output power of the pick-up head according to the first signal; and when the voltage difference between the first input port and the output port of the comparator circuit stabilizes, the first switch is utilized to connect the first input port of the comparator circuit to the sensor, and the second switch is utilized to connect the output port of the comparator circuit to the drive circuit so that the drive circuit controls the output power of the pick-up head according to the comparative signal.

14. The APC loop of claim 13, wherein the power supply is a voltage source, and the output signal of the power supply is a voltage signal.

15. The APC loop of claim 14, wherein the voltage source provides a ground potential.

16. The APC loop of claim 13, wherein the power supply is a current source, and the output signal of that power supply is a current signal.

17. The APC loop of claim 13, wherein the first signal is generated from calibrating the comparative signal of the comparator circuit when the voltage difference between the first input port and the output port of the comparator circuit approaches stabilization.

18. The APC loop of claim 13, wherein the second input port of the comparator circuit is connected to a second signal source for inputting a second signal, and the comparator circuit will compare the second signal with the output signal of the power supply or with the detecting signal of the sensor so as to generate the comparative signal.

19. The APC loop of claim 18, wherein the second signal source is a digital to analog (D/A) converter.

20. The APC loop of claim 13, wherein the APC loop further comprises a switch controller for controlling the first switch and the second switch according to the comparative signal of the comparator circuit and the first signal.

21. The APC loop of claim 20, wherein when the output power of the pick-up head is to be changed, the switch controller will utilize the first switch to connect the first input port of the comparator circuit to the power supply, the switch controller will utilize the second switch to connect the first signal source to the drive circuit, and afterwards when the number of times that the comparative signal is equivalent to the first signal reaches a predetermined value, the first switch is utilized to connect the first input port of the comparator circuit to the sensor, and the second switch is utilized to connect the output port of the comparator circuit to the drive circuit.

22. The APC loop of claim 13, wherein the comparator circuit comprises an operation amplifier, a capacitor, and two resistors.

23. The APC loop of claim 13, wherein the sensor is a photodiode for detecting the output power of the pick-up head.

24. The APC loop of claim 13, wherein the APC loop further comprises an amplification circuit electrically connected to the second switch for amplifying the first signal or the comparative signal.

* * * * *